(12) United States Patent
Erdmann et al.

(10) Patent No.: US 9,872,365 B2
(45) Date of Patent: Jan. 16, 2018

(54) METHOD AND APPARATUS FOR REPLACING A DEVICE IN A NETWORK

(75) Inventors: Bozena Erdmann, Aachen (DE); Oliver Schreyer, Herzogenrath (DE); Armand Michel Marie Lelkens, Heerlen (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 1427 days.

(21) Appl. No.: 12/517,293

(22) PCT Filed: Nov. 30, 2007

(86) PCT No.: PCT/IB2007/054874
§ 371 (c)(1),
(2), (4) Date: Jun. 2, 2009

(87) PCT Pub. No.: WO2008/068693
PCT Pub. Date: Jun. 12, 2008

(65) Prior Publication Data
US 2010/0077254 A1 Mar. 25, 2010

(30) Foreign Application Priority Data
Dec. 6, 2006 (EP) .................................. 06125517

(51) Int. Cl.
G06F 17/30 (2006.01)
H05B 37/02 (2006.01)
G06T 7/215 (2017.01)

(52) U.S. Cl.
CPC ......... *H05B 37/0245* (2013.01); *G06T 7/215* (2017.01); *H05B 37/02* (2013.01)

(58) Field of Classification Search
CPC .. H05B 37/02; H05B 37/0245; G06T 7/2006; G06T 7/215
See application file for complete search history.

(56) References Cited

U.S. PATENT DOCUMENTS

| | | | |
|---|---|---|---|
| 5,193,176 A * | 3/1993 | Brandin | 714/14 |
| 6,046,550 A * | 4/2000 | Ference et al. | 315/291 |
| 6,243,773 B1 * | 6/2001 | Mahalingam | 710/302 |
| 6,460,055 B1 * | 10/2002 | Midgley et al. | 707/640 |

(Continued)

FOREIGN PATENT DOCUMENTS

| | | |
|---|---|---|
| JP | 8335199 A | 12/1996 |
| JP | 2002077197 A | 3/2002 |

(Continued)

OTHER PUBLICATIONS

"Howstuffworks—How PCI Works," by Tyson, Jeff. Screenshots provided from WaybackMachine for Jun. 25, 2004. Original URL: http://www.howstuffworks.com/pci4.htm.*

*Primary Examiner* — Leslie Wong

(57) ABSTRACT

The invention relates to a method for replacing a device in a network comprising a plurality of devices. The method includes a step of storing (132) replicated data of a first device in a storage means, a step of removing (352) the first device from the network, a step of connecting (354) a second device to the network, a step of providing (262) a replacement information comprising the first identifier and a step of providing (272) the replicated data of the first device from the storage means to the second device.

11 Claims, 3 Drawing Sheets

(56) References Cited

U.S. PATENT DOCUMENTS

| | | | |
|---|---|---|---|
| 6,618,819 B1* | 9/2003 | Adamovits et al. | 714/13 |
| 6,970,948 B2* | 11/2005 | Brown et al. | 710/8 |
| 2002/0115341 A1* | 8/2002 | Hein | H01R 25/14 439/495 |
| 2004/0160199 A1 | 8/2004 | Morgan et al. | |
| 2004/0250964 A1 | 12/2004 | Carmen, Jr. et al. | |
| 2005/0035717 A1 | 2/2005 | Adamson et al. | |
| 2005/0091452 A1* | 4/2005 | Chen et al. | 711/114 |
| 2005/0138205 A1* | 6/2005 | Naismith | 709/245 |
| 2005/0278438 A1* | 12/2005 | Sandaire | H04L 29/12264 709/223 |
| 2006/0031488 A1* | 2/2006 | Swales | 709/224 |
| 2006/0047787 A1* | 3/2006 | Agarwal et al. | 709/220 |
| 2006/0051157 A1* | 3/2006 | Bornstein et al. | 401/206 |
| 2006/0126620 A1* | 6/2006 | Bonar | G06F 8/35 370/389 |
| 2006/0244624 A1 | 11/2006 | Wang et al. | |
| 2006/0294305 A1* | 12/2006 | Ballard et al. | 711/115 |
| 2007/0140525 A1* | 6/2007 | Kottomtharayil | G06Q 10/087 382/103 |
| 2007/0250180 A1* | 10/2007 | Bump | G05B 19/41845 700/1 |
| 2007/0268516 A1* | 11/2007 | Bugwadia et al. | 358/1.15 |
| 2008/0049779 A1* | 2/2008 | Hopmann | H04L 12/2807 370/431 |

FOREIGN PATENT DOCUMENTS

| | | |
|---|---|---|
| JP | 2003032277 A | 1/2003 |
| JP | 2007288809 A | 11/2007 |
| WO | 2006099422 A2 | 9/2006 |

* cited by examiner

METHOD AND APPARATUS FOR REPLACING A DEVICE IN A NETWORK

The invention relates to replacing a device in a network comprising a plurality of devices and may be used for hot replacement particularly in control networks.

Control networks such as lighting, heating or ventilation control networks for building automation are becoming more and more hidden from the user. These networks comprise devices like light ballasts, switches, sensors, actuators, meters etc. connected e.g. by RF (radio frequency) modules. For such networks, comprising a large number of devices and distributed application logic, new procedures for setup and maintenance are required in order to guarantee a smooth operation. US 20050035717 A1 describes a remote lighting control system comprising a plurality of ballasts. A ballast table stored in computer-readable memory stores control points for one or more ballast. A control point may define a light intensity. The ballast table may be generated and changed remotely. Updates to the ballast table may be downloaded to a controller, making the light control system robust and readily changeable. This allows for a variety of remotely controllable lighting schemes.

It is an object of the present invention to provide an improved method, apparatus and network for replacing a device in a network, particularly a control network.

In order to achieve the object above, the invention provides a method for replacing a device in a network comprising a plurality of devices, comprising storing replicated data of a first device in a storage means,
connecting a second device to the network,
providing a replacement information comprising a first identifier which identifies the first device,
providing the replicated data of the first device from the storage means to the second device.

In order to achieve the object above, the invention further provides an apparatus for replacing a device in a network comprising a plurality of devices, comprising:

means for storing replicated data of a first device in a storage means,
means for connecting a second device to the network,
means for providing a replacement information comprising the first identifier which identifies the first device,
means for providing the replicated data of the first device from the storage means to the second device.

In order to achieve the object above, the invention further provides a network comprising a plurality of devices, wherein a first device is replaceable by a second device, comprising:

the second device, wherein the second device is configured to provide a replacement information, the replacement information comprising a first identifier which identifies the first device,
a storage means for storing replicated data of the first device, wherein the storage means is configured to provide the replicated data of the first device from the storage means to the second device.

The characteristic features according to the present invention enable hot replacement, i.e. the replacement of one device by another one, for example by an equal or similar one. The network may be a control network, such as a lighting control network, comprising a large number of devices and distributed application logic. An advantage of the invention is that a maintenance procedure like hot replacement of a device can be performed without an essentially noticeable effect on the running system and with minimum setup or maintenance effort for a user. According to embodiments of the present invention, hot replacement in a distributed control network allows re-instantiation of control logic of a replaced device on a new device, renewal of a relationship of control logic on the new device to state variables of other devices, reinstallation of a state information of the replaced device on the new device and reinstallation of a relationship to control logic on other devices acting on state variables or attributes of the replaced device.

A basic idea of the invention is to provide hot replacement of a network device based on state and particularly control logic replication and explicit establishment of identifier relationships.

According to an embodiment of the invention, storing replicated data of the first device may be performed on a regular basis. According to a further embodiment of the invention, storing replicated data of the first device may be performed in response to a failure of the first device or in response to a change in the replicated data on the first device. The replicated data may comprise control logic, support logic and current values of attributes of a network device, or any combination of those. The storage means for storing the replicated data may be a central storage means device or a single or multiple peer-device(s) with storage means according to embodiments of the invention. The first device may comprise replication means being configured to send the replicated data to the storage means after a failure of the first device according to an embodiment of the invention. The replication means may comprise an independent power source according to a further embodiment.

According to an embodiment of the invention, the first device to be replaced may be removed from the network particularly before, simultaneous with or after connecting the second device which replaces the first device to the network according to embodiments of the invention.

According to an embodiment, the inventive method may further comprise a step of providing the first identifier to the second device and the replacement information may be provided by the second device. The first identifier may be provided to the second device before connecting the second device to the network according to an embodiment of the invention. For receiving the first identifier, the second device may comprise an interface for inputting the first identifier. The input interface may comprise mechanical means to set the first identifier or may comprise a reader configured to read the first identifier from a bar code or an RF-ID tag according to embodiment of the invention.

According to an alternative embodiment, the first identifier may be provided to the second device after connecting the second device to the network. The first identifier and a second identifier which identifies the second device may be provided to a controller. After receiving information about the connection of the second device to the network, the controller may provide the first identifier from the controller to the second device. The controller may comprise an input interface for inputting the first identifier and a second identifier which identifies the second device, means for informing the controller about a connection of the second device to the network and means for providing the first identifier from the controller to the second device. The input interface may be configured to allow a user to enter the first and second identifiers or to select the first device and enter the second identifier. Alternatively, the input interface may comprise a reader configured to read the first and second identifiers from a bar code or a RF-ID tag.

The controller may reside on a dedicated node of the control network.

According to a further embodiment, providing the first identifier to the second device may further comprises a step of providing additional data to the second device, the additional data comprising an identifier of the storage means, information of device functions or identifiers of related devices. The controller or the first device may comprise storage means for storing the additional data.

According to a further embodiment, a third device may be related to the first device. Relationship information in the third device may be updated with the second identifier.

The invention also relates to an apparatus or device implementing the method for replacing a device in a network comprising a plurality of devices and to a system or network comprising devices being configured for performing the method for replacing a device in a network comprising a plurality of devices The invention will be described in more detail hereinafter with reference to exemplary embodiments. However, the invention is not limited to these exemplary embodiments.

In the following, functional similar or identical elements may have the same reference numerals.

Networked control systems are a ubiquitous trend in commercial, industrial and institutional business and also consumer markets. A network according to the invention may be a building automation system, e.g. for lighting, heating and ventilation or safety. A further example network is a control network like a lighting control system, a home control system or an atmosphere lighting system. Further areas of application of the present invention are complex lighting control systems, with occupancy and daylight sensors and pre-defined rules, for example for weekdays and weekends, working and after work hours and all other control and automation environments, including industrial, retail, institutional and residential. The network may consist of devices like light ballasts, switches, daylight or occupancy sensors, remote controllers, actuators or meters. The devices being part of the network can be arranged as nodes of the network. The network may be a wireless network comprising devices being connected wirelessly, for example via RF modules.

Large-scale control networks, in which the nodes themselves tend to become reduced in size, may be built in a distributed manner. Functions are provided that handle information from multiple network nodes and interact with multiple network nodes. The distributed information space spans over state information of all devices belonging to the network. Distributed control applications may act on the distributed information establishing virtual relationships among devices of the network. This may be the case if information about the state of one device is necessary for functions of another device.

Figure 1:
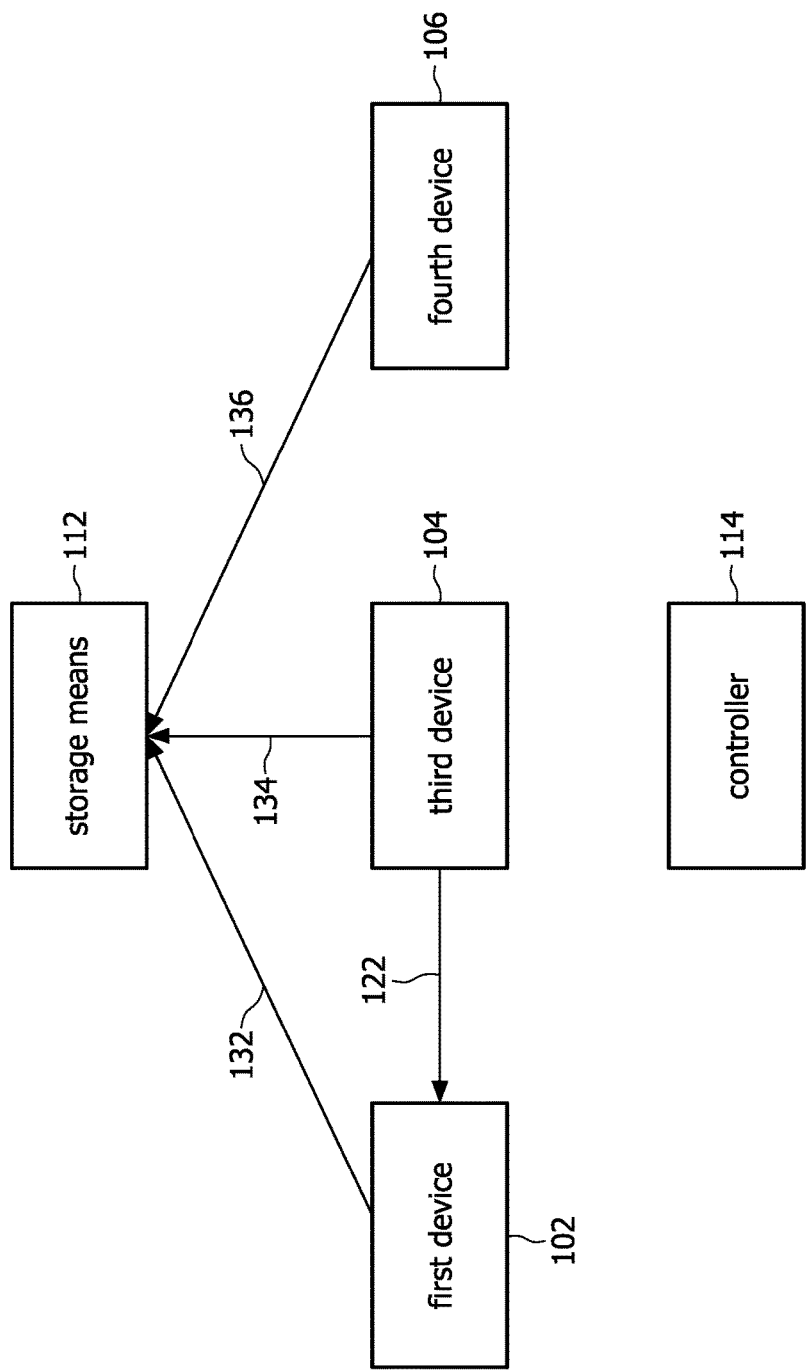
FIG. 1 shows a network according to the invention.

FIG. 1 shows a network according to an embodiment of the present invention. Any interconnections between the devices or nodes (e.g. topology or routing paths) necessary for the network to function, for example, as a building automation system, are not shown in the figures. The devices may comprise communication interfaces (not shown in the figures) which allow a data exchange between the devices of the network.

The network shown in FIG. 1 comprises a first device 102, a third device 104, a fourth device 106 and a storage means 112. The network may comprise a plurality of further devices (not shown in the figures). Additionally, the network may comprise a controller 114. There may be relationships between all or individual of the devices 102, 104, 106. According to this embodiment, there is a relationship 122 between the first device 102 and the third device 104. The devices 102, 104, 106 are configured to provide 132, 134, 136 operational data, defining an actual functionality of the devices 102, 104, 106, to the storage means 112. The storage means 112 is configured to store the data provided from the devices 102, 104, 106.

The present invention allows for hot replacement of the devices 102, 104, 106. In the following, a replacement of an old device is described. As an example, the first device 102 is chosen to be the old device to be replaced by a new device. The new device, to replace to first device 102 is a second device 202 (shown in FIG. 2). Alternatively any other device 104, 106 whose data is stored could be replaced.

A concept of the present invention is to replicate 132 application logic and state information of the first device 102 in the network and to download the replicated data to a new device, after a physical replacement of the first device 102.

The replicated data may be held at the selected appropriate storage means 112 in the network. Preferably, the storage means 112 does not operate on the replicated data, meaning that the storage means does not execute the replicated control logic and does neither maintain relationships nor state variable values, neither during presence of the first device 102 nor after disappearance or removal of the first device 102. The storage means 112 only stores the replicated data. The storage means 112 may be a central storage or a single or multiple well-defined peer-device(s) with respective storage means.

A replication of state information and control logic of the first device 102 may be performed on a regular basis. For example, the data to be replicated 132, 134, 136 may be provided by the devices 102, 104, 106 at predefined time intervals or triggered by predefined events, like changes in the network configuration. The devices 102, 104, 106 may be configured to send the replicated data to the storage means 112 by themselves or the storage means 112 or any suitable control device may be configured to poll the replicated data from the devices 102, 104, 106. The data of all devices 102, 104, 106 may be replicated. Alternatively only data of selected devices, like the first device 102 may be replicated. Replicating the data on a regular basis minimizes the risk that the device disappears from the network without its last state replicated, for example, in case a device 102, 104, 106 gets broken or depleted of power. An optimization of the replication process, for example a reduction of required network resources, may be possible if only particular data has to be stored regularly. For example, in case the control logic does not change frequently, it may be sufficient to only regularly update the state information, i.e. the current state variables values. Alternatively, only control logic and support logic is replicated, for example only on system startup and when it changes.

According to an embodiment, the replication of state information and logic may be triggered before the first device 102 leaves the network, for example due to a device defect. This presumes that the implementation of the first device 102 allows such a procedure. For power depletion, dismounting, removing or switching off the device, the first device 102 may comprise an additional, preferably small, power source, like a battery or a capacitor, to send the state replica.

Preferably, the total time consumed by the replacement procedure, from disappearance of the first device 102 to the start of normal operation by the new device, is reasonably short, such that recent state variables values are part of the replicated data. In case those recent state variables values are not part of the replicated data, the state variables values may be re-instantiated upon the new device joining the network.

For any replacement procedure, a mapping between identifiers, e.g. MAC addresses, of the old replaced device and the new replacing device needs to be established. Alternatively, the new device may be assigned the logical identifier of the old device, for example the old device's network address, application layer identifier or user-friendly name.

Figure 2:
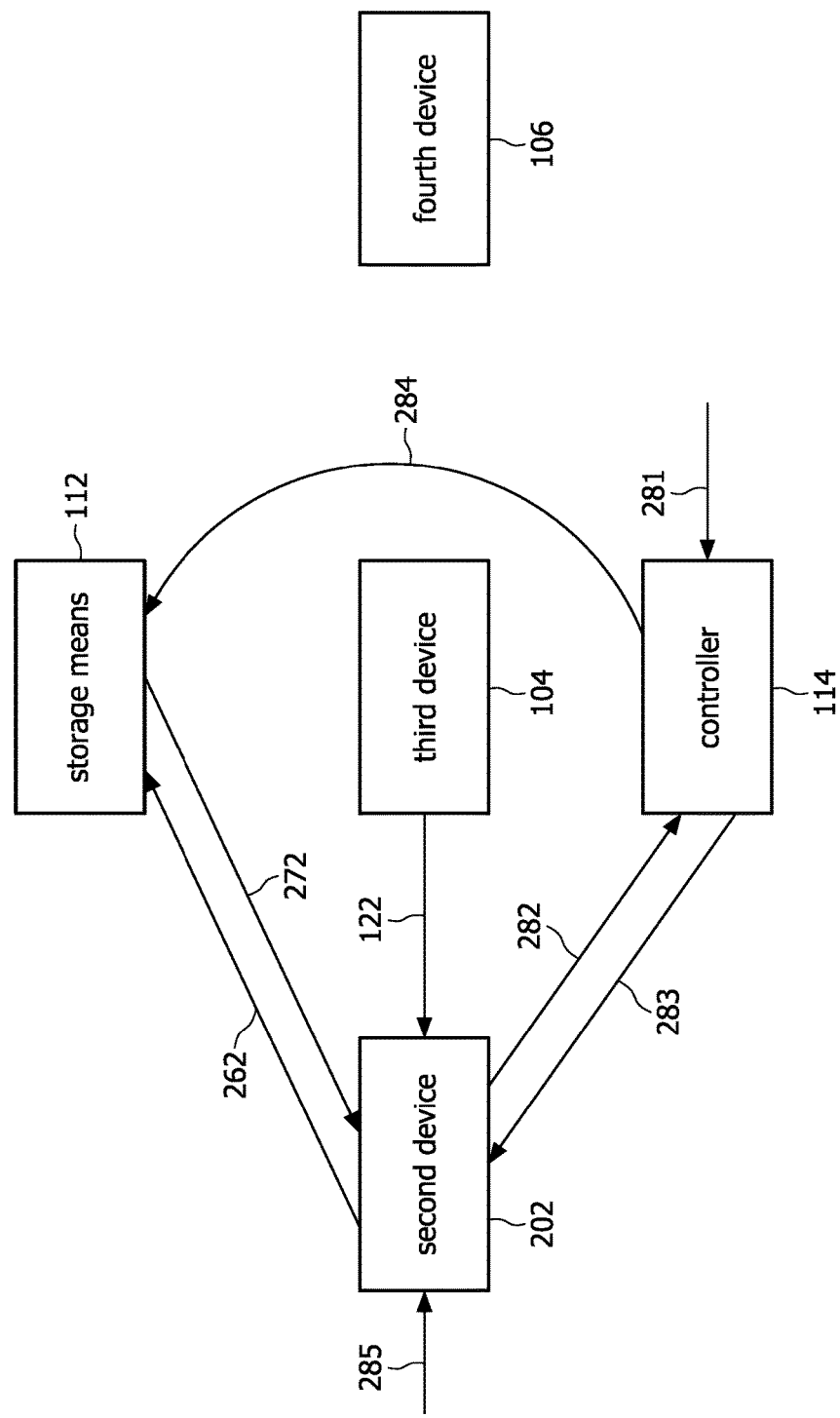
FIG. 2 shows a network according to the invention.

FIG. 2 shows the network described in FIG. 1, wherein the first device 102 has been replaced by a second device 202. According to the invention a mapping between the first identifier of the first device 102 and the second identifier of the second device 202 is established by matching the first identifier and the second identifier in an explicit initial step. Further, the second device 202 is configured to initiate a re-instantiation of control logic, relationships and state information after joining the network. The second device 202 may be configured to inform 262 the storage means 112 about the replacement of the first device 102. In response, the storage means 112 may be configured to provide 272 the replicated data of the first device 102 to the second device 202.

For mapping the identifiers, the first and second identifier may be provided 281 to the controller 114. After informing 282 the controller 114 about the second device 202 having connected to the network, the controller 114 may provide 283 the first identifier to the second device 202. Alternatively, the first identifier can be provided 285 directly to the second device 202.

For a network comprising the controller 114, the controller 114 may be configured to inform the second device 202 in an initial step that it is the replacement for the first device 102. Alternatively, the controller 114 may be configured to inform the storage means 112 in an initial step 284 that the second device 202 is the replacement for the first device 102. The initial step may be triggered by the second device 202 entering the network. The controller 114 may comprise a user interface for inserting 281 the identifiers of the first and second device into the controller 114 by manual entry. Alternatively the identifiers can be inserted 281 by advanced solutions like reading bar codes or RF-ID tags, being superior with respect to ease of use. For reading bar codes or RF-ID tags, the central controller may comprise a suitable reader and the devices 102, 202 may comprise a bar code or integrated RF-ID tag including the identifier. For inserting 281 the identifiers into the controller 114, the devices 102, 202 are touched or held adjacent to the reader. Alternatively, rather than entering both identifiers, the controller 114 may be configured to allow the user to select the device 102 to be replaced at the controller device user interface. For example, the selection can be based on an icon, location, function, description or name of the first device 102. The selection is possible as the first device 102 is already known to the system. The user only needs to enter the second identifier of the replacement device 102. For entering the second identifier any of the methods described previously can be used. The second identifier may be used by the controller 114 to address a message including the first identifier to the second device 202.

In an alternative embodiment, the network may not comprise the controller 114 or the network may comprise a controller 114 but the controller 114 is not used for providing the mapping of the first and second identifier. According to this embodiment, the first identifier of the first device 102 is directly provided 285 to the second device 202. The first identifier may be the physical address of the first device 102 or any logical address associated with the first device for the operation, for example network address, application layer identifier or user-friendly name. The first identifier may be provided 285 to the second device 202 by external means, for example at a related read-write interface (not shown in the figures) of the second device 202. The read-write interface may comprise mechanical means to set a number related to the first identifier, a RF-ID reader for reading an RF-ID tag from the first device 102 or a programming interface for programming the first identifier, for example via in-band protocol. The first identifier may be provided 285 to the second device 202 before, while or after the second device 202 is connecting to the network.

According to a further embodiment, the information the new device receives, for example in the replacement message or directly from the old device, may contain more than just the old device's identifier. The information may also contain an identifier of the replica holder or information about device functions or identifiers of the related devices, or any combination thereof. The central controller or the old device may maintain this information. For example, the old device may maintain this information in a passive storage.

In order to provide 272 the second device 202 with the replicated data of the first device, the storage means 112 is informed 262 about the replacement of the first device 102 by the second device 202. The second device 202 may be configured to inform the storage means 112 about the replacement, in response to receiving 283, 285 the first identifier, by providing the first identifier to the storage means 112. Alternatively, if the controller 114 is used, the controller 114 may be configured to inform the storage means 112 about the replacement. In response to receiving the first identifier the storage means 112 may be configured to provide 272 the replicated data of the first device 102 to the second device 202.

In order to inform any network device about the replacement, the second device 202, the controller 114 or any other suitable device may broadcast the second identifier.

According to an embodiment, the third device 104 having a relationship with the replaced first device 102 is configured to update its control and support logic by itself upon getting the identifier of the new device 202. If the third device 104 is not configured to update by itself, for example if the third device 104 is uploaded with compiled byte code, logic re-compilation may become necessary. Preferably, the logic re-compilation does not require user involvement.

Figure 3:
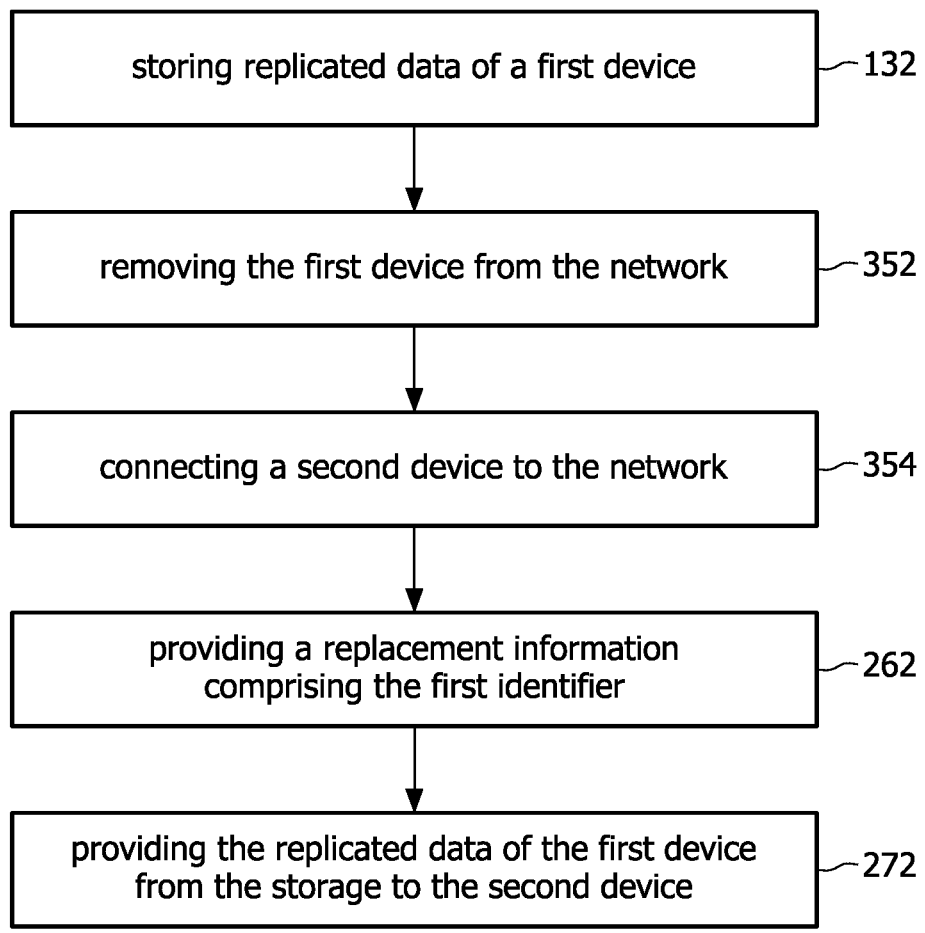
FIG. 3 shows method according to the invention.

FIG. 3 shows a flowchart of a hot replacement procedure according to an embodiment of the invention.

In a first step, the data to be replicated is stored 132.

In a following step, the old device for which the state information has been replicated on another device of the network is removed 352. The old device may be removed from the network by being physically disconnected or due to an error or break down.

In a following step, the new device connects 354 to the network and gets knowledge of the identifier of the old device. By getting knowledge of the identifier of the old device, the new device gets knowledge that it is used as replacement for the old device.

According to a first embodiment the second device is connected to the network by performing the following steps. In a first step, the identifiers of the old and new device are inserted at the central controller. Following, the new device is placed and activated, and connects to the network. Next, the new device announces its appearance via broadcast or unicast message to the central controller. Finally, the central controller responds with a dedicated replacement message including the identifier or address of the old device.

According to an alternative embodiment the second device is connected to the network by performing the following steps. In a first step the identifier of the old device is inserted at the new device. Next, the new device is placed and activated, and connects to the network.

After being connected to the network, the new device broadcasts 262 its appearance as replacement for the old device.

As a response, the holder of the state information replica of the old device responds to the new device with sending 272 the state information.

If the network includes relationships between devices, all devices check whether they held a relationship to the old device. The relationship may comprise logic changing state of the old device or support logic informing the old device about a change of local state used as input for logic running on the old device. In case a particular device held a relationship to the old device, the particular device is configured to update its relationship information with the identifier of the new device. Optionally, all devices of which the old device was using state information as input for local logic, update the new device with the current state of their state variables as an initial value.

After having received the replica data of the old device, the new device is configured to install the state of the old device and optionally, if provided, also the initial values for the state variables.

Finally, the new device starts normal operation with in the network.

A new device not replacing another device is not having or getting replacement information, for example is not getting a replacement message after the initial announcement. Thus, the new device which is not replacing an old device starts normal operation without performing the above replacement procedure steps following the connection of the new device to the network.

The networks described are chosen exemplarily only. Other network structures comprising any number of nodes or devices can implement the present invention. If suitable, the described method steps may be performed in a different order and features of the described embodiments may be combined. The devices of the network may be configured to perform the inventive method on their own. Alternatively, the network may comprise an apparatus being configured to perform the inventive method on the network, for example by controlling the individual devices. Any suitable communication protocol may be used for communication between the network devices.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A method for replacing a device in a network comprising a plurality of devices, comprising:
   storing replicated data of a first device in a storage means, the replicated data comprising state information pertaining to the first device,
   connecting a second device to the network, wherein the second device informs the storage means that the second device is a replacement of the first device, initiated by the connection of the second device,
   wirelessly scanning the first and second devices to obtain a respective first and second identifier, which identifies the respective device;
   providing to the second device the first identifier, wherein the second device is not provided with the first identifier until after the second device is connected to the network,
   informing the storage means from the second device about the replacement of the first device by providing replacement information from the second device to the storage means, the replacement information comprising the first identifier which identifies the first device, and
   providing the replicated data of the first device from the storage means to the second device.

2. The method according to claim 1, wherein the step of providing the first identifier to the second device further comprises a step of providing additional data to the second device, the additional data comprising an identifier of the storage means, information of device functions or identifiers of related devices.

3. The method according to claim 2, wherein the controller or the first device comprises storage means for storing the additional data.

4. The method according to claim 1, wherein storing replicated data of the first device is performed in response to a failure of the first device or a change in the replicated data on the first device.

5. The method according to claim 1, wherein a third device is related to the first device and wherein the method further comprises a step of updating a relationship information in the third device with a second identifier which identifies the second device.

6. The method according to claim 1 wherein storing replicated data of the first device is performed at predefined time intervals.

7. An apparatus for replacing a device in a network comprising a plurality of devices, comprising:
   a storage device to store replicated data of a first device in a storage means, the replicated data comprising state information pertaining to the first device,
   a controller to connect a second device to the network, wherein the second device informs the storage device that the second device is a replacement of the first device, initiated by the connection of the second device, receive wireless scans of the first and second devices to obtain a respective first and second identifier, which identifies the respective device, provide the second device with the first identifier which identifies the first device, wherein the second device is not providing with the first identifier until after the second device is connected to the network, inform the storage device from the second device about the replacement of the first device by providing replacement information comprising the first identifier, and provide the replicated data of the first device from the storage means to the second device.

8. A network comprising a plurality of devices, wherein a first device is replaceable by a second device, comprising:
   a storage device to store replicated data of the first device, the replicated data comprising state information pertaining to the first device, a scanner to scan the first and second devices to obtain a respective first and second identifier, which identifies the respective device;

a controller configured to, after being informed by the second device that the second device is a replacement of the first device, initiated by the connection of the second device, provide the second device with the first identifier which identifies the first device, wherein the second device is not providing with the first identifier until after the second device is connected to the network, wherein the second device is configured to inform the storage means about the replacement of the first device by providing replacement information, the replacement information comprising the first identifier, and wherein the storage device is configured to provide the replicated data of the first device from the storage means to the second device in response to the replacement information.

9. The network according to claim 8, wherein the second device comprises an interface for inputting the first identifier.

10. The network according to claim 8, wherein the first device comprises a controller configured to send the replicated data to the storage means after a failure of the first device.

11. The network according to claim 10, wherein the controller comprises an independent power source.

* * * * *